(12) United States Patent
Liu et al.

(10) Patent No.: US 11,411,619 B2
(45) Date of Patent: Aug. 9, 2022

(54) DETERMINING A PRECODER FOR PTRS PORTS

(71) Applicant: LENOVO (BEIJING) LIMITED, Beijing (CN)

(72) Inventors: Hongmei Liu, Beijing (CN); Chenxi Zhu, Fairfax, VA (US); Zhennian Sun, Beijing (CN); Bingchao Liu, Beijing (CN); Vijay Nangia, Woodridge, IL (US)

(73) Assignee: Lenovo (Beijing) Limited, Beijing (CN)

( * ) Notice: Subject to any disclaimer, the term of this patent is extended or adjusted under 35 U.S.C. 154(b) by 19 days.

(21) Appl. No.: 16/975,019

(22) PCT Filed: Feb. 23, 2018

(86) PCT No.: PCT/CN2018/077027
§ 371 (c)(1),
(2) Date: Aug. 21, 2020

(87) PCT Pub. No.: WO2019/161539
PCT Pub. Date: Aug. 29, 2019

(65) Prior Publication Data
US 2021/0036746 A1  Feb. 4, 2021

(51) Int. Cl.
*H01Q 1/24* (2006.01)
*H04B 7/0456* (2017.01)
(Continued)

(52) U.S. Cl.
CPC ......... *H04B 7/0456* (2013.01); *H04L 5/0048* (2013.01); *H04W 72/042* (2013.01); *H01Q 1/246* (2013.01)

(58) Field of Classification Search
CPC ... H04L 5/0048; H04L 5/0051; H04L 5/0053; H04L 5/001; H04L 5/0007; H04L 5/0055;
(Continued)

(56) References Cited

U.S. PATENT DOCUMENTS

| 10,419,087 | B2 * | 9/2019 | Kim ............... H04W 72/042 |
| 2017/0201300 | A1 | 7/2017 | Parkvall et al. |

(Continued)

FOREIGN PATENT DOCUMENTS

| WO | 2017176602 A1 | 4/2017 |
| WO | 2017200315 A1 | 11/2017 |
| WO | 201802722 A1 | 2/2018 |

OTHER PUBLICATIONS

Vivo, "Discussion on PT-RS", R1-1712843, Vivo, 3GPP TSG RAN WG1 Meeting #90, Aug. 21-25, 2017, pp. 1-3.
(Continued)

*Primary Examiner* — Eva Y Puente
(74) *Attorney, Agent, or Firm* — Kunzler Bean & Adamson

(57) ABSTRACT

Apparatuses, methods, and systems are disclosed for determining a precoder for PTRS ports. One method (800) includes receiving (802) information indicating a precoder for transmission. The method (800) includes determining (804) a precoder for each phase tracking reference signal port based on the information. Another method (900) includes transmitting (902) information indicating a precoder for transmission. The method (900) includes receiving (904) one or more phase tracking reference signal ports precoded with the precoder.

20 Claims, 7 Drawing Sheets

(51) Int. Cl.
*H04L 5/00* (2006.01)
*H04W 72/04* (2009.01)

(58) Field of Classification Search
CPC ..... H04L 5/0094; H04L 1/1819; H04L 5/005; H04L 1/0003; H04L 1/1812; H04L 1/1896; H04L 25/0226; H04W 72/042; H04W 72/0446; H04W 72/1289; H04W 72/0453; H04W 24/10; H04W 72/046; H04W 76/11; H04W 80/02; H04W 24/08; H04W 72/0493; H04W 72/1268; H04W 74/0833; H04B 7/0695; H04B 7/088; H04B 7/0617; H04B 17/318; H04B 7/0456; H04B 7/022; H04B 7/024; H04B 7/0408; H04B 7/063; H04B 7/0639; H04B 7/15542; H04B 17/17; H04B 17/336
USPC ........................................................ 370/329
See application file for complete search history.

(56) References Cited

U.S. PATENT DOCUMENTS

| | | |
|---|---|---|
| 2018/0041259 A1 | 2/2018 | Kim et al. |
| 2020/0076647 A1* | 3/2020 | Zhang ................. H04L 25/0224 |
| 2020/0382252 A1* | 12/2020 | Sun ..................... H04L 27/2613 |
| 2021/0168011 A1* | 6/2021 | Davydov ............ H04W 72/042 |
| 2021/0288842 A1* | 9/2021 | Chatterjee ............ H04L 5/0094 |

OTHER PUBLICATIONS

Lenovo, "Discussion on PTRS/DMRS port association", R1-1712683, Lenovo/Motorola Mobility, 3GPP TSG RAN WG1 Meeting #90, Aug. 21-25, 2017, pp. 1-2.

PCT/CN2018/077027, "International Search Report and the Written Opinion of the International Search Authority" ISA/CN, State Intellectual Property Office of the P.R. China, dated May 24, 2018, pp. 1-6.

* cited by examiner

600

| Value 602 | DMRS Port 604 |
|---|---|
| 0 | DMRS Port Transmitting Layer Corresponding To SRS Port Of First SRS Resource Indicated By SRI |
| 1 | DMRS Port Transmitting Layer Corresponding To SRS Port Of Second SRS Resource Indicated By SRI |
| 2 | DMRS Port Transmitting Layer Corresponding To SRS Port Of Third SRS Resource Indicated By SRI |
| 3 | DMRS Port Transmitting Layer Corresponding To SRS Port Of Fourth SRS Resource Indicated By SRI |

| First PTRS Port 702 | | Second PTRS Port 704 | |
|---|---|---|---|
| Value Of A MSB 706 | DMRS Port 708 | Value Of A LSB 710 | DMRS Port 712 |
| 0 | DMRS Port Transmitting Layer Corresponding To SRS Port Of First SRS Resource Indicated By SRI With Configured PTRS Port 0 | 0 | DMRS Port Transmitting Layer Corresponding To SRS Port Of First SRS Resource Indicated By SRI With Configured PTRS Port 1 |
| 1 | DMRS Port Transmitting Layer Corresponding To SRS Port Of Second SRS Resource Indicated By SRI With Configured PTRS Port 0 | 1 | DMRS Port Transmitting Layer Corresponding To SRS Port Of Second SRS Resource Indicated By SRI With Configured PTRS Port 1 |

FIG. 7

DETERMINING A PRECODER FOR PTRS PORTS

FIELD

The subject matter disclosed herein relates generally to wireless communications and more particularly relates to determining a precoder for PTRS ports.

BACKGROUND

The following abbreviations are herewith defined, at least some of which are referred to within the following description: Third Generation Partnership Project ("3GPP"), Authentication Authorization and Accounting ("AAA"), Positive-Acknowledgment ("ACK"), Acknowledged Mode ("AM"), Access and Mobility Management Function ("AMF"), Access Server ("AS"), Authentication Server Function ("AUSF"), Cell Radio Network Temporary Identifier ("C-RNTI"), CSI-RS resource ID ("CRI"), Channel State Information ("CSI"), Database ("DB"), Dedicated Control Channel ("DCCH"), Downlink ("DL"), Demodulation Reference Signal ("DMRS"), Domain Name System ("DNS"), Enhanced Mobile Broadband ("eMBB"), Evolved Node B ("eNB"), Enhanced Subscriber Identification Module ("eSIM"), Equipment Identity Register ("EIR"), Evolved Packet Core ("EPC"), European Telecommunications Standards Institute ("ETSI"), E-UTRAN Radio Access Bearer ("E-RAB"), Evolved-Universal Terrestrial Radio Access Network ("E-UTRAN"), Frequency Division Duplex ("FDD"), Frequency Division Multiple Access ("FDMA"), Fully Qualified Domain Name ("FQDN"), Global System For Mobile Communications Association ("GSMA"), Hybrid Automatic Repeat Request ("HARQ"), Home Policy Control Function ("H-PCF"), Home Public Land Mobile Network ("HPLMN"), Identity or Identifier or Identification ("ID"), International Mobile Equipment Identity ("IMEI"), International Mobile Subscriber Identity ("IMSI"), Internet-of-Things ("IoT"), Layer Indication ("LI"), Long Term Evolution ("LTE"), Least Significant Bit ("LSB"), Multiple Access ("MA"), Modulation Coding Scheme ("MCS"), Mobile Country Code ("MCC"), Mobile Network Code ("MNC"), Machine Type Communication ("MTC"), Master Information Block ("MIB), Mobility Management ("MM"), Mobility Management Entity ("MME"), Most Significant Bit ("MSB"), Non-Access Stratum ("NAS"), Narrowband ("NB"), Negative-Acknowledgment ("NACK") or ("NAK"), Next Generation Node B ("gNB"), New Radio Access Technology ("NR"), Network Data Analytics ("NWDA"), Orthogonal Frequency Division Multiplexing ("OFDM"), Over-the-Air ("OTA"), Policy Control Function ("PCF"), Packet Data Convergence Protocol ("PDCP"), Public Land Mobile Network ("PLMN"), Pointer ("PTR"), Phase Tracking Reference Signal ("PTRS"), Physical Uplink Shared Channel ("PUSCH"), Quality of Service ("QoS"), Random Access Channel ("RACH"), Radio Link Control ("RLC"), Radio Link Failure ("RLF"), Radio Network Layer ("RNL"), Radio Resource Control ("RRC"), Radio Resource Management ("RRM"), Radio Access Network ("RAN"), Reference Signal ("RS"), Reference Signal Received Power ("RSRP"), Reference Signal Received Quality ("RSRQ"), Receive ("RX"), Service Data Unit ("SDU"), Sequence Number ("SN"), Single Carrier Frequency Division Multiple Access ("SC-FDMA"), Subscriber Management Function ("SMF"), Subscriber Identity Module ("SIM"), System Information Block ("SIB"), SRS resource indicator ("SRI"), Sounding Reference Signal ("SRS"), Synchronization Signal Block ("SSB"), Subscription Concealed Identifier ("SUCI"), Subscription Permanent Identifier ("SUPI"), Timing Advance Group ("TAG"), Tracking Area ("TA"), Transport Block ("TB"), Transport Network Layer ("TNL"), Temporary Rank Indicator ("TRI"), Transmit ("TX"), Transmitted Precoding Matrix Indicator ("TPMI"), Unified Data Management ("UDM"), User Data Repository ("UDR"), User Entity/Equipment (Mobile Terminal) ("UE"), Universal Integrated Circuit Card ("UICC"), Uplink ("UL"), Universal Mobile Telecommunications System ("UMTS"), User Plane Function ("UPF"), Universal Subscriber Identity Module ("USIM"), Visited Policy Control Function ("V-PCF"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, PTRS may be associated with DMRS.

BRIEF SUMMARY

Methods for determining a precoder for PTRS ports are disclosed. Apparatuses and systems also perform the functions of the apparatus. In one embodiment, the method includes receiving information indicating a precoder for transmission. In various embodiments, the method includes determining a precoder for each phase tracking reference signal port based on the information.

In one embodiment, the method includes determining the precoder for each phase tracking reference signal port based on downlink control information signaling. In a further embodiment, the method includes interpreting the downlink control information signaling based on a radio resource control signaling configuration. In certain embodiments, the method includes interpreting the downlink control information signaling based on a sounding reference signal resource indication in the downlink control information signaling. In various embodiments, the method includes determining the precoder for each phase tracking reference signal port based on predetermined information. In some embodiments, the predetermined information is one portion of downlink control information signaling.

An apparatus for determining a precoder for PTRS ports, in one embodiment, includes a receiver that receives information indicating a precoder for transmission. In various embodiments, the apparatus includes a processor that determines a precoder for each phase tracking reference signal port based on the information.

In one embodiment, a method for transmitting a precoder includes transmitting information indicating a precoder for transmission. In various embodiments, the method includes receiving one or more phase tracking reference signal ports preceded with the precoder.

In one embodiment, a precoder for each phase tracking reference signal port is determined based on downlink control information signaling. In a further embodiment, the downlink control information signaling is interpreted based on a radio resource control signaling configuration. In certain embodiments, the downlink control information signaling is interpreted based on a sounding reference signal resource indication in the downlink control information signaling. In various embodiments, a precoder for each phase tracking reference signal port is determined based on predetermined information. In some embodiments, the predetermined information is one portion of downlink control information signaling.

An apparatus for transmitting a precoder, in one embodiment, includes a transmitter that transmits information indicating a precoder for transmission. In some embodiments, the apparatus includes a receiver that receives one or more phase tracking reference signal ports precoded with the precoder.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 illustrates one embodiment of a PTRS port to DMRS port association for one or more UL PTRS ports;

FIG. 7 illustrates another embodiment of a PTRS port to DMRS port association for one or more UL PTRS ports;

DETAILED DESCRIPTION

Figure 1:
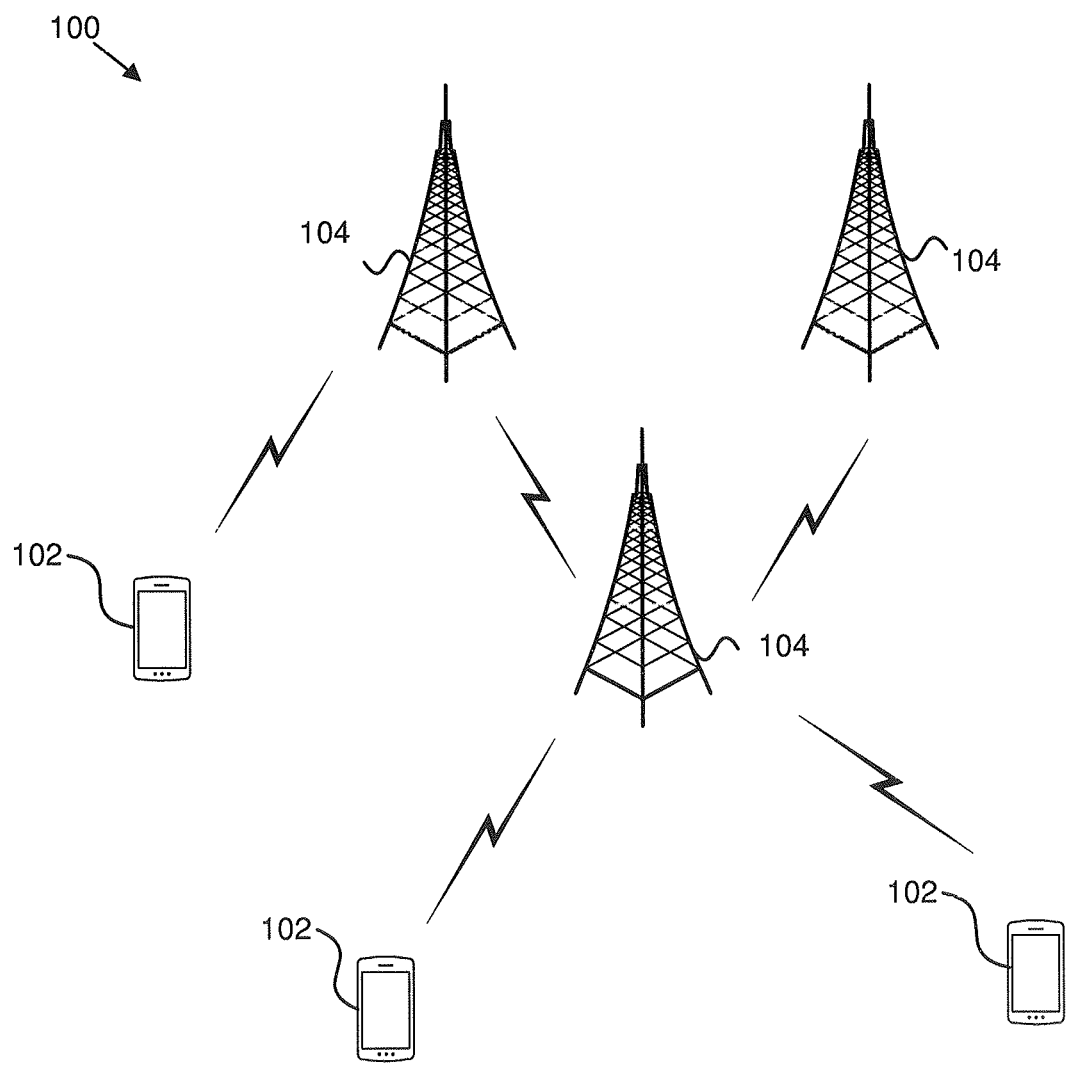
FIG. 1 is a schematic block diagram illustrating one embodiment of a wireless communication system for determining a precoder for PTRS ports and/or transmitting information with a precoder.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for determining a precoder for PTRS ports and/or transmitting information with a precoder. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base unit, a base station, a Node-B, an eNB, a gNB, a Home Node-B, a relay node, a device, a network device, or by any other terminology used in the art.

The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art. In some embodiments, a network unit 104 may include one or more of the following network components an eNB, a gNB, an AMF, a RAN, a DB, an MME, a PCF, a UDR, a UPF, an NWDA, a serving gateway, and/or a UDM.

In one implementation, the wireless communication system 100 is compliant with the LTE of the 3GPP protocol, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a remote unit 102 may receive information indicating the precoder for transmission. The information indicating the precoder may be based on selected sounding reference signal resources. The selection of sounding reference signal resources may be done by DCI signaling. If there are multiple SRS resources for a PTRS port, the precoder indication may be used to select one SRS resource from the multiple SRS resources. The precoder used for the selected SRS resource may be used for PTRS transmission. In various embodiments, the remote unit 102 may determine a precoder for each phase tracking reference signal port based on the information. Accordingly, a remote unit 102 may be used for determining a precoder for PTRS ports.

In various embodiments, a network unit 104 may transmit information indicating a precoder for transmission. In various embodiments, the network unit 104 may receive one or more PTRS ports precoded with the precoder. Accordingly, a network unit 104 may be used for transmitting information with a precoder.

Figure 2:
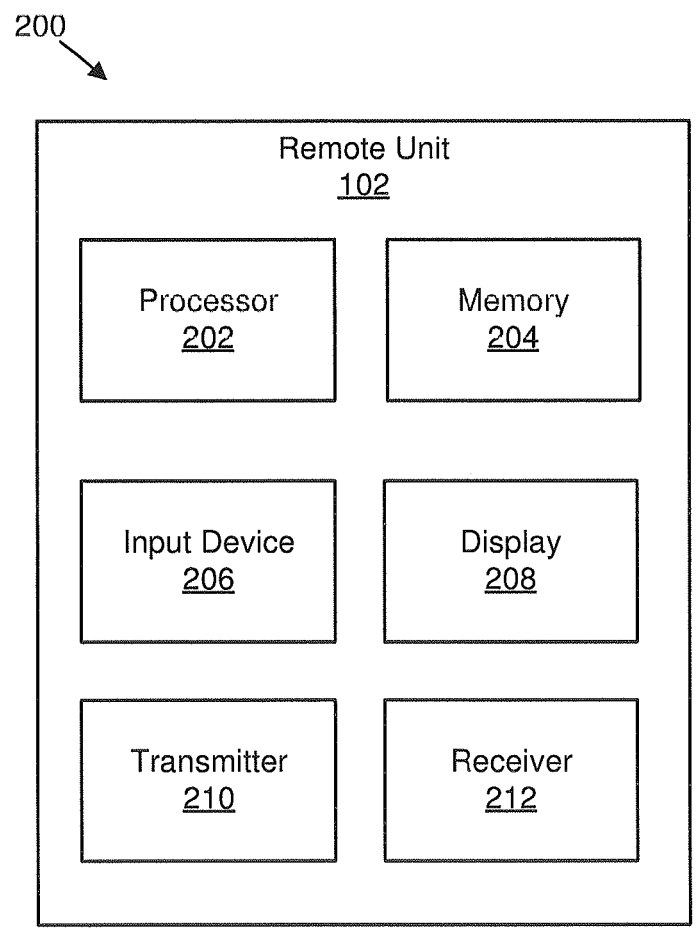
FIG. 2 is a schematic block diagram illustrating one embodiment of an apparatus that may be used for determining a precoder for PTRS ports.

FIG. 2 depicts one embodiment of an apparatus 200 that may be used for determining a precoder for PTRS ports. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine a precoder for each phase tracking reference signal port based on received information. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In various embodiments, the receiver 212 may receive information indicating a precoder for transmission. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
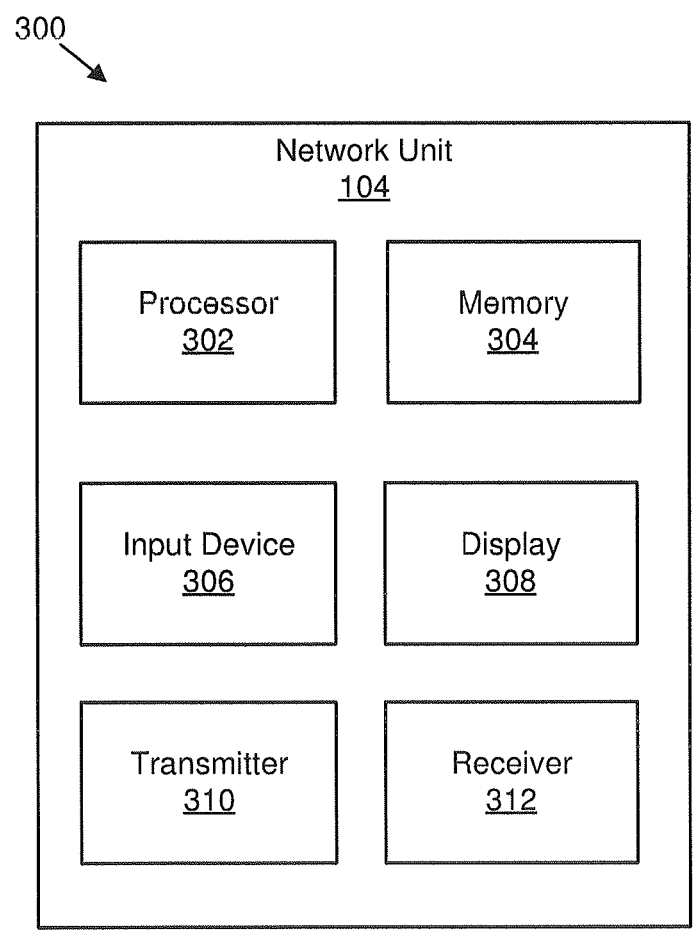
FIG. 3 is a schematic block diagram illustrating one embodiment of an apparatus that may be used for transmitting information with a precoder.

FIG. 3 depicts one embodiment of an apparatus 300 that may be used for transmitting information with a precoder. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transmitter 310 transmits information indicating a precoder for transmission. In some embodiments, the receiver 312 receives one or more PTRS ports precoded with the precoder. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, an SRI may include 0 bits, $$\left\lceil \log_2\left(\sum_{k=1}^{L_{max}} \binom{N_{SRS}}{k}\right)\right\rceil \text{ bits, or } \lceil\log_2(N_{SRS})\rceil \text{ bits.}$$

In such embodiments, $N_{SRS}$ may indicate a number of configured SRS resources in an SRS resource set that are associated with a higher layer parameter (e.g., "SRS-SetUse" having a value "CodeBook" or "NonCodeBook"). Moreover, in such embodiments, $L_{max}$ may indicate a maximum number of supported layers for PUSCH. In certain embodiments, an SRI may include 0 bits if there are no SRS resources configured. In various embodiments, an SRI may include $$\left\lceil \log_2\left(\sum_{k=1}^{L_{max}} \binom{N_{SRS}}{k}\right)\right\rceil$$

for non-codebook based PUSCH transmissions. In such embodiments, $N_{SRS}$ may indicate a number of configured SRS resources in an SRS resource set associated with a higher layer parameter "SRS-SetUse" having a value "Non-CodeBook." In some embodiments, an SRI may include $\lceil\log_2(N_{SRS})\rceil$ bits for codebook based PUSCH transmissions. In such embodiments, $N_{SRS}$ may indicate a number of configured SRS resources in an SRS resource set associated with a higher layer parameter "SRS-SetUse" having a value "CodeBook."

Figure 4:
FIG. 4 illustrates one embodiment of a PTRS port to DMRS port association for one UL PTRS port.
Figure 5:
FIG. 5 illustrates one embodiment of a PTRS port to DMRS port association for two UL PTRS ports.

In various embodiments, a number of bits for a PTRS to DMRS association may be: 0 bits if UL-PTRS-present=OFF and PUSCH-tp=Disabled, or if PUSCH-tp—Enabled; or 2 bits. FIGS. 4 and 5 illustrate various embodiments used to indicate an association between PTRS ports and DMRS ports.

FIG. 4 illustrates one embodiment of a PTRS port to DMRS port association 400 for one UL PTRS port (e.g., UL-PTRS-ports=1). Specifically, a transmitted value 402 corresponds to a DMRS port 404, as illustrated. For example, the transmitted value 402 of 0 is associated with the DMRS port 0, the transmitted value 402 of 1 is associated with the DMRS port 1, the transmitted value 402 of 2 is associated with the DMRS port 2, and the transmitted value 402 of 3 is associated with the DMRS port 3.

FIG. 5 illustrates one embodiment of a PTRS port to DMRS port association 500 for two UL PTRS ports (e.g., UL-PTRS-ports=2). Specifically, a value of a MSB 502 corresponds to a DMRS port 504, and a value of a LSB 506 corresponds to a DMRS port 508. For example, the transmitted value of the MSB 502 of 0 is associated with first DMRS port transmitting layers corresponding to SRS ports 0 and 2, the transmitted value of the MSB 502 of 1 is associated with second DMRS port transmitting layers corresponding to SRS ports 0 and 2, the transmitted value of the LSB 506 of 0 is associated with first DMRS port transmitting layers corresponding to SRS ports 1 and 3, and the transmitted value of the LSB 506 of 1 is associated with second DMRS port transmitting layers corresponding to SRS ports 1 and 3.

In some embodiments, for non-codebook based UL transmission, an actual number of UL PTRS ports to transmit may be determined based on the SRI. In such embodiments, a remote unit 102 may be configured with a PTRS port index for each configured SRS resource by using a higher layer parameter (e.g., UL-PTRS-SRS-mapping-non-CB). Moreover, in such embodiments, if the PTRS port index associated with different SRIs are the same, the corresponding UL DMRS ports may share the one UL PTRS port.

In various embodiments, for partial-coherent and/or non-coherent codebook based UL transmission, an actual number of UL PTRS ports may be determined based on TPMI and/or TRI in DCI format 0_1. In certain embodiments, if a remote unit 102 is configured with certain a higher layer parameter (e.g., UL-PTRS-ports set to 2), actual UL PTRS ports and associated transmission layers may be derived from indicated TPMI as: SRS ports 0 and 2 indicated in TPMI may share PTRS port 0; SRS ports 1 and 3 indicated in TPMI may share PTRS port 1. Moreover, in certain embodiments; UL PTRS port 0 may be associated with an UL layer [x] of layers which are transmitted with SRS port 0 and SRS port 2 indicated in TPMI, and UL PTRS port 1 may be associated with an UL layer [y] of layers which are transmitted with SRS port 1 and SRS port 3 indicated in TPMI. In such embodiments, [x] and/or [y] may be provided by DCI parameter PTRS to DMRS association (e.g., as found in DCI format 0_1).

In some embodiments, for DL, PTRS to DMRS port association may be implemented by a network unit 104 with a remote unit 102 reporting LI information. In various embodiments, for codebook based UL transmission, PTRS to DMRS port association may be indicated by DCI signaling. In certain embodiments, for non-codebook based UL transmission, there may be a maximum of four 1-port SRS resources configured by a network unit 104 to determine an uplink transmission precoder with DCI signaling. In some embodiments, for non-codebook based UL transmission, RRC signaling may be used to configure a PTRS port for each SRS resource. In certain embodiments, for non-codebook based UL transmission, at most two PTRS ports may be configured.

In some embodiments, to have full flexibility for an SRS resource to PTRS mapping using RRC signaling, different bits may be used for different PTRS ports. In embodiments in which there is one PTRS port, 2 bits may be used, and one embodiment of the signaling is shown in FIG. 6. In embodiments in which there are two PTRS ports, 4 bits may be used with 2 bits used for each PTRS port. The signaling details for each PTRS port, if there are two PTRS ports, is also shown in FIG. 6. Accordingly, if 2 bits are used there may be one PTRS port, and if 4 bits are used there may be two PTRS ports, with each set of two bits indicating a value corresponding to a DMRS port. This method for 2-bit signaling for each PTRS port of 2-PTRS ports may be used at least for configurations in which more than 4 (e.g., up to 8) SRS resources may be configured in an SRS resource set with up to 4 SRS resources configured with the same PTRS port providing flexibility in PTRS to DMRS association.

FIG. 6 illustrates one embodiment of a PTRS port to DMRS port association 600 for one or more UL PTRS ports (e.g., UL-PTRS-ports=1 or 2). In some embodiments, the PTRS port to DMRS port association 600 may be for non-codebook based UL transmission. As illustrated in FIG. 6, the PTRS port to DMRS port association 600 includes a transmitted value 602 that corresponds to a DMRS port 604. For example, the transmitted value 602 of 0 is associated with a DMRS port transmitting layer corresponding to an SRS port of a first SRS resource indicated by SRI, the transmitted value 602 of 1 is associated with a DMRS port transmitting layer corresponding to an SRS port of a second SRS resource indicated by SRI, the transmitted value 602 of 2 is associated with a DMRS port transmitting layer corresponding to an SRS port of a third SRS resource indicated by SRI, and the transmitted value 602 of 3 is associated with a DMRS port transmitting layer corresponding to an SRS port of a fourth SRS resource indicated by SRI. In these examples, there are multiple SRS resources within a SRS resource set, and there is an SRS port for each SRS resource. The SRS ports of all the SRS resources are transmitted with a precoder. For DMRS port transmission, the precoder of a DMRS port is selected from precoders used for SRS transmission. For example, the precoder of DMRS port 0 is the same as that of SRS port of SRS resource 0. In one embodiment, value 0 means that the precoder of the PTRS port is the same as the precoder of SRS resource 0, and it is also same as the precoder of DMRS port 0.

In some embodiments, if there is only 1 PTRS port, and there are at most 4 SRS resources, the 2 bits in FIG. 6 may be used to indicate the precoder for the PTRS port.

In some embodiments, if there are more than 1 PTRS ports, the 2 bits in FIG. 6 may be used to indicate the precoder for each PTRS port. Thus, 2 bits are used for PTRS port 0 and another 2 bits are used for PTRS port 1. This is applied at least for a configuration in which each PTRS port is shared by 4 SRS resources for phase estimation.

In some embodiments, in order to keep a common framework as codebook based UL transmission signaling (e.g., 2 bits for a PTRS precoder indication for a 2 PTRS port configuration), 2 bit signaling may be used for precoder indication for the 2 PTRS ports. There may be a reinterpretation based on RRC signaling. In various embodiments, the RRC signaling may configure PTRS port 0 to be used by an SRS resource for phase estimation, and PTRS port 1 to be used by remaining SRS resources (e.g., at most 3), then the 2 bits signaling may be used to select one SRS resource for precoder determination for PTRS port 1 (e.g., based on FIG. 6). In such embodiments, there may be no DCI signaling for PTRS port 0. In one embodiments, if PTRS port 0 is used by SRS resource 0, SRS resource 1, and SRS resource 2, then value 0, 1, or 2 can be indicated to determine the precoder for PTRS port 0, and value 3 is not available. And the precoder of PTRS port 1 is the same as the precoder of SRS resource 3 per RRC signaling configuration. In another embodiment, if PTRS port 0 is used by SRS resource 0 and SRS resource 1 for phase estimation, and PTRS port 1 is used by SRS resource 3, and the SRI indication in DCI signaling indicates that SRS resource 0, 1, and 3 are used to determine uplink precoder, then value 0 or value 1 may be indicated to determine the precoder of PTRS port 0. If value 0 is indicated, then the precoder of PTRS port 0 is the same as that of SRS resource 0. And if value 1 is indicated, then the precoder of PTRS port 0 is the same as that of SRS resource 1. And value 2 and value 3 will not be indicated. The precoder of PTRS port 1 may be the same as that of SRS resource 3, as there is already RRC signaling indicating that SRS resource 3 use PTRS port 1 for phase estimation.

In another embodiment, RRC signaling may configure PTRS port 0 to be used by more than 1 SRS resources for phase estimation, and PTRS port 1 may be used by only 1 SRS resources for phase estimation. Moreover, 2 bits signaling may be used to select one SRS resources for precoder determination for PTRS port 0, and there may be no DCI signaling for PTRS port 1.

In certain embodiments, if RRC signaling configures PTRS port 0 to be used by two SRS resources for phase estimation, and PTRS port 1 to be used by the other two SRS resources for phase estimation, a corresponding precoder indication may be used based on FIG. 7.

FIG. 7 illustrates another embodiment of a PTRS port to DMRS port association 700 for more than 1 UL PTRS ports (e.g., UL-PTRS-ports=2). In some embodiments, the PTRS port to DMRS port association 700 may be for non-codebook based UL transmission. As illustrated in FIG. 7, the PTRS port to DMRS port association 700 includes a first PTRS port 702 (e.g., PTRS port 0) and a second PTRS port 704 (e.g., PTRS port 1). Moreover, a value of a MSB 706 that corresponds to a DMRS port 708 is used for the first PTRS port 702, and a value of a LSB 710 that corresponds to a DMRS port 712 is used for the second PTRS port 704. For example, for the first PTRS port 702, the transmitted value of the MSB 706 of 0 is associated with a DMRS port transmitting layer corresponding to an SRS port of a first SRS resource indicated by SRI with configured PTRS port 0, and the transmitted value of the MSB 706 of 1 is associated with a DMRS port transmitting layer corresponding to an SRS port of a second SRS resource indicated by SRI with configured PTRS port 0. Moreover, for the second PTRS port 704, the transmitted value of the LSB 710 of 0 is associated with a DMRS port transmitting layer corresponding to an SRS port of the first SRS resource indicated by SRI with configured PTRS port 1, and the transmitted value of the LSB 710 of 1 is associated with a DMRS port transmitting layer corresponding to an SRS port of the second SRS resource indicated by SRI with configured PTRS port 1. In certain embodiments, if PTRS port 0 is used by SRS resource 0 and SRS resource 1 for phase estimation, and PTRS port 1 is used by SRS resource 2 and SRS resource 3 for phase estimation. Then the MSB of the 2 bits is used to indicate the precoder for PTRS port 0, and the LSB is used to indicate the precoder for PTRS port 1. For example, if the MSB value is 0, then the precoder of PTRS port 0 may be the same as that of SRS resource 0. If the MSB value is 1, then the precoder of PTRS port 0 may be the same as that of SRS resource 1. If the LSB value is 0, then the precoder of PTRS port 1 may be the same as that of SRS resource 2. If the LSB value is 1, then the precoder of PTRS port 1 may be the same as that of SRS resource 3.

In certain embodiments, to be common with PTRS to DMRS port association signaling for codebook based UL transmission for a 2 port PTRS configuration, there may be a scheduling restriction such that a single PTRS port may be shared by at most two SRS resources. In some embodiments, a difference between a codebook based configuration and a non-codebook based configuration may be that an SRS port is replaced by an SRS resource selected by SRI in DCI signaling. As may be appreciated, signaling for 2 port PTRS may be configured as illustrated in FIG. 7 and/or signaling for 1 port PTRS may be configured as illustrated in FIG. 6.

In various embodiments, DMRS ports and SRS resources may use a same set of precoders, there may be a one-to one mapping between a DMRS port index and a SRS resource index, and/or there may be no restriction that an index is to be the same as defined in a specification (e.g., due to DMRS port multiplexing consideration). In some embodiments, precoders used and/or indexes used may be determined based on a remote unit 102 implementation.

In certain embodiments, an association between PTRS ports and DMRS ports may be defined in a specification and/or otherwise predetermined. In various embodiments, there may be a default association between PTRS ports and DMRS ports. For example, the in one embodiment: for 1 port PTRS, the PTRS may be associated with a DMRS port transmitting layer corresponding to an SRS port of a first SRS resource indicated by SRI (e.g., corresponding to value "0" in FIG. 6; for 2 port PTRS, a first PTRS may be associated with a DMRS port transmitting layer corresponding to an SRS port of a first SRS resource indicated by SRI with configured PTRS port 0 (e.g., corresponding to MSB "0" in FIG. 7), and a second PTRS may be associated with a DMRS port transmitting layer corresponding to an SRS port of the first SRS resource indicated by SRI with configured PTRS port 1 (e.g., corresponding to LSB "0" in FIG. 7).

Figure 8:
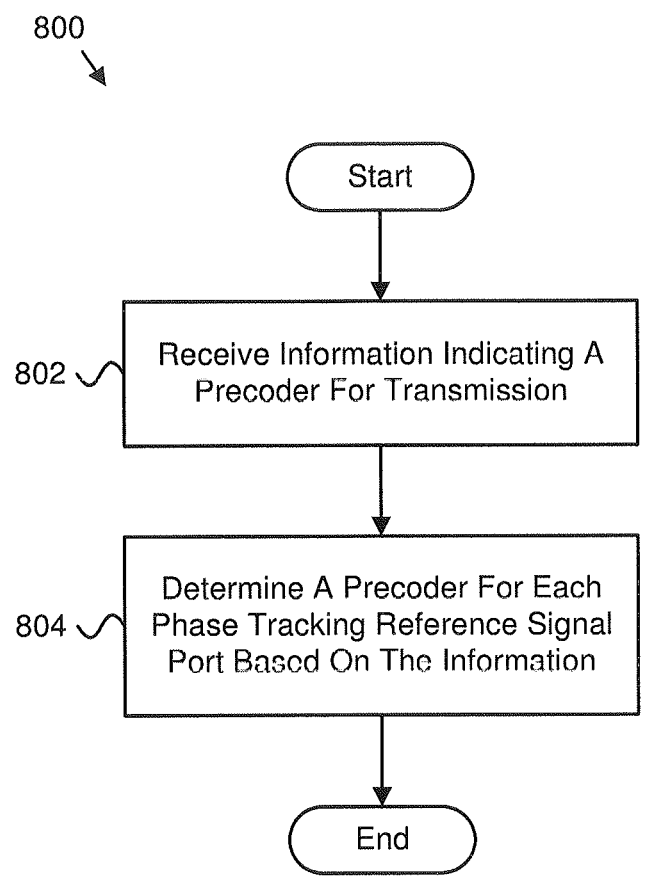
FIG. 8 is a schematic flow chart diagram illustrating one embodiment of a method for determining a precoder for PTRS ports.

FIG. 8 is a schematic flow chart diagram illustrating one embodiment of a method 800 for determining a precoder for PTRS ports. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include receiving 802 information indicating a precoder for transmission. In various embodiments, the method 800 includes determining 804 a precoder for each phase tracking reference signal port based on the information.

In one embodiment, the method 800 includes determining the precoder for each phase tracking reference signal port based on downlink control information signaling. In a further embodiment, the method 800 includes interpreting the downlink control information signaling based on a radio resource control signaling configuration. In certain embodiments, the method 800 includes interpreting the downlink control information signaling based on a sounding reference signal resource indication in the downlink control information signaling. In various embodiments, the method 800 includes determining the precoder for each phase tracking reference signal port based on predetermined information. In some embodiments, the predetermined information is one portion of downlink control information signaling.

Figure 9:
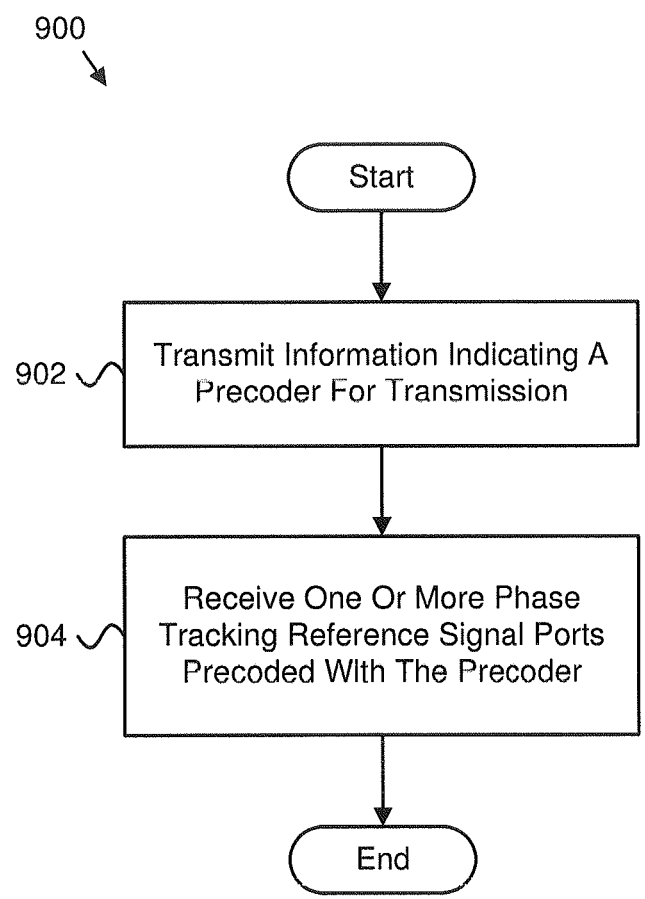
FIG. 9 is schematic flow chart diagram illustrating one embodiment of a method for transmitting information with a precoder.

FIG. 9 is a schematic flow chart diagram illustrating one embodiment of a method 900 for transmitting information with a precoder. In some embodiments, the method 900 is performed by an apparatus, such as the network unit 104. In certain embodiments, the method 900 may be performed by a processor executing program code, for example, a microcontroller, a microprocessor, a CPU, a GPU, an auxiliary processing unit, a FPGA, or the like.

The method 900 may include transmitting 902 information indicating a precoder for transmission. In various embodiments, the method 900 includes receiving 904 one or more phase tracking reference signal ports precoded with the precoder.

In one embodiment, a precoder for each phase tracking reference signal port is determined based on downlink control information signaling. In a further embodiment, the downlink control information signaling is interpreted based on a radio resource control signaling configuration. In certain embodiments, the downlink control information signaling is interpreted based on a sounding reference signal resource indication in the downlink control information signaling. In various embodiments, a precoder for each phase tracking reference signal port is determined based on predetermined information. In some embodiments, the predetermined information is one portion of downlink control information signaling.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving information indicating a first demodulation reference signal (DMRS) associated with at least one phase tracking reference signal (PTRS) port for non-codebook based uplink (UL) transmission, wherein the first DMRS port is associated with a DMRS port transmitting layer corresponding to a sounding reference signal (SRS) port of an SRS resource indicated by an SRS resource indicator (SRI), and each SRS is associated with the at least one PTRS port; and
   determining an associated DMRS port for the at least one PTRS port based on the information.

2. The method of claim 1, wherein the information is transmitted by downlink control information (DCI) using 1 or 2 bits.

3. The method of claim 2, wherein the information comprises a predefined value, and the predefined value is part of a set of values indicated by DCI.

4. The method of claim 1, wherein the SRS resource comprises only 1 SRS port.

5. The method of claim 1, wherein a number of PTRS ports for non-codebook based UL transmission is based on a radio resource control (RRC) configuration of an associated PTRS port for the SRS resource indicated by the SRI.

6. The method of claim 1, wherein the first DMRS port and the at least one PTRS port are transmitted with the same precoder.

7. The method of claim 1, wherein, if the at least one PTRS port comprises only one PTRS port and at most four SRS resources, then 2 bits are used to indicate a precoder of the at least one PTRS port.

8. The method of claim 1, wherein, if the at least one PTRS port comprises two PTRS ports, then 2 bits are used to indicate a precoder for the two PTRS ports based on reinterpretation of RRC signaling.

9. The method of claim 8, wherein, if a first PTRS port of the two PRTS ports is associated with 3 SRS resources and a second PTRS port of the two PRTS ports is associated with 1 SRS resources, then the 2 bits are used to select one SRS resource for precoder determination for the first PTRS port.

10. The method of claim 8, wherein, if a first PTRS port of the two PRTS ports is associated with 2 SRS resources and a second PTRS port of the two PRTS ports is also associated with 2 SRS resources, then a most significant bit (MSB) of the 2 bits is used to indicate a DMRS port used for the first PTRS port, and a least significant bit (LSB) of the 2 bits is used to indicate a DMRS port used for the second PTRS port.

11. An apparatus comprising:
a receiver that receives information indicating a first demodulation reference signal (DMRS) associated with at least one phase tracking reference signal (PTRS) port for non-codebook based uplink (UL) transmission, wherein the first DMRS port is associated with a DMRS port transmitting layer corresponding to a sounding reference signal (SRS) port of an SRS resource indicated by an SRS resource indicator (SRI), and each SRS is associated with the at least one PTRS port; and
a processor that determines an associated DMRS port for the at least one PTRS port based on the information.

12. A method comprising:
transmitting information indicating a first demodulation reference signal (DMRS) associated with at least one phase tracking reference signal (PTRS) port for non-codebook based uplink (UL) transmission, wherein the first DMRS port is associated with a DMRS port transmitting layer corresponding to a sounding reference signal (SRS) port of an SRS resource indicated by an SRS resource indicator (SRI), and each SRS is associated with the at least one PTRS port; and
receiving an associated DMRS port for the at least one PTRS port based on the information.

13. The method of claim 12, wherein the information is transmitted by downlink control information (DCI) using 1 or 2 bits.

14. The method of claim 13, wherein the information comprises a predefined value, and the predefined value is part of a set of values indicated by DCI.

15. The method of claim 12, wherein the SRS resource comprises only 1 SRS port.

16. The method of claim 12, wherein a number of PTRS ports for non-codebook based UL transmission is based on a radio resource control (RRC) configuration of an associated PTRS port for the SRS resource indicated by the SRI.

17. The method of claim 12, wherein the first DMRS port and the at least one PTRS port are transmitted with the same precoder.

18. The method of claim 12, wherein, if the at least one PTRS port comprises only one PTRS port and at most four SRS resources, then 2 bits are used to indicate a precoder of the at least one PTRS port.

19. The method of claim 12, wherein, if the at least one PTRS port comprises two PTRS ports, then 2 bits are used to indicate a precoder for the two PTRS ports based on reinterpretation of RRC signaling.

20. An apparatus comprising:
a transmitter that transmits information indicating a first demodulation reference signal (DMRS) associated with at least one phase tracking reference signal (PTRS) port for non-codebook based uplink (UL) transmission, wherein the first DMRS port is associated with a DMRS port transmitting layer corresponding to a sounding reference signal (SRS) port of an SRS resource indicated by an SRS resource indicator (SRI), and each SRS is associated with the at least one PTRS port; and
a receiver that receives an associated DMRS port for the at least one PTRS port based on the information.

* * * * *